No. 671,967. Patented Apr. 16, 1901.
J. J. KISER & G. C. JOHNSON.
DRY POWDER SPRAYER.
(Application filed July 19, 1900.)
(No Model.) 2 Sheets—Sheet 1.

WITNESSES,
K. M. Imboden,
M. L. Lange

INVENTORS,
J. J. Kiser and G. C. Johnson.
BY Higdon & Higdon,

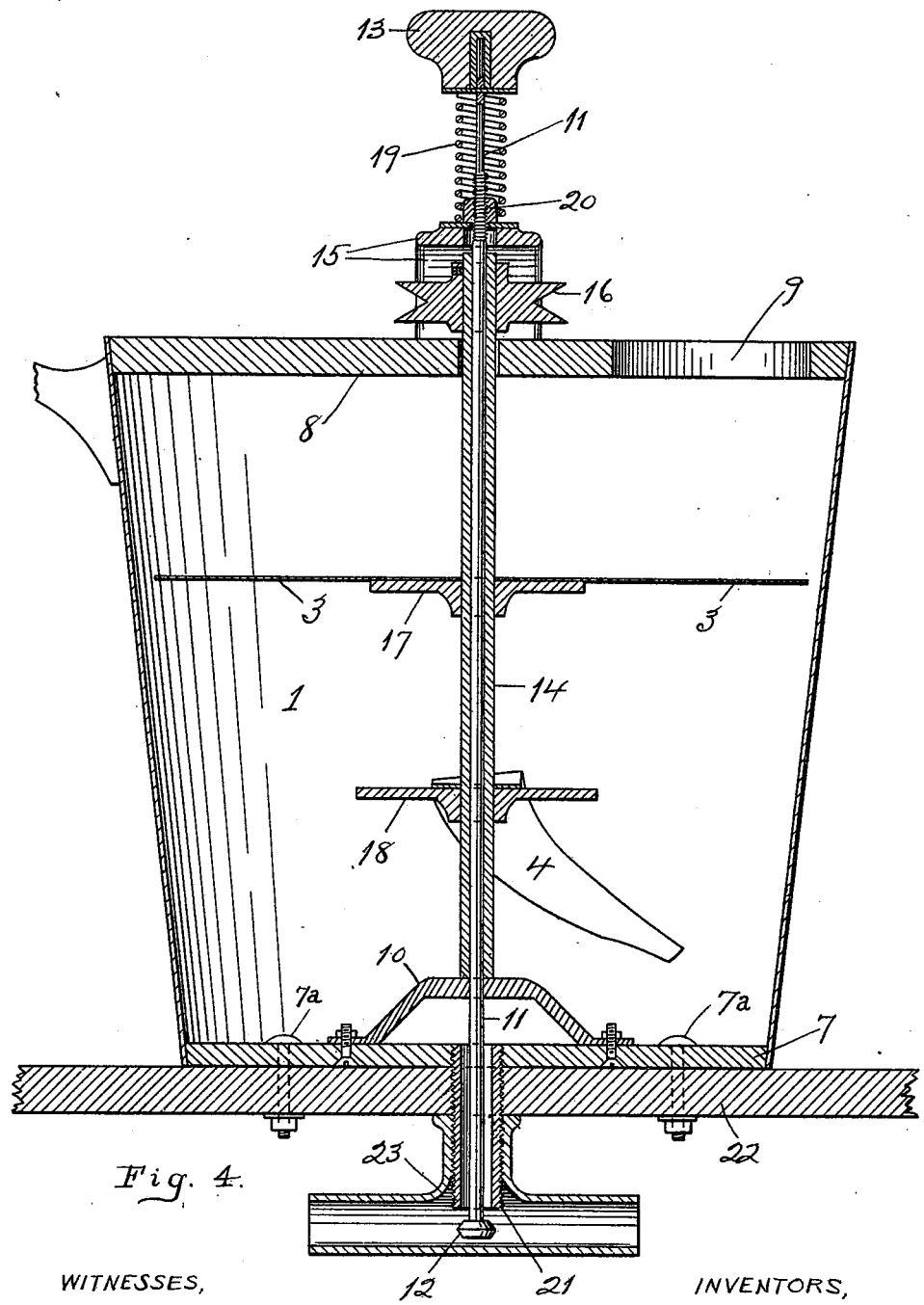

UNITED STATES PATENT OFFICE.

JACOB J. KISER, OF STANBERRY, MISSOURI, AND GEORGE C. JOHNSON, OF ARGENTINE, KANSAS.

DRY-POWDER SPRAYER.

SPECIFICATION forming part of Letters Patent No. 671,967, dated April 16, 1901.

Application filed July 19, 1900. Serial No. 24,161. (No model.)

*To all whom it may concern:*

Be it known that we, JACOB J. KISER, a resident of Stanberry, in the county of Gentry and State of Missouri, and GEORGE C. JOHNSON, a resident of Argentine, in the county of Wyandotte and State of Kansas, citizens of the United States, have invented certain new and useful Improvements in Dry-Powder Sprayers, of which the following is a specification.

Our invention relates to dry-powder sprayers; and the object of our invention is to provide an apparatus by which a spray of insecticide or fungicide powder may be thrown upon trees, plants, or other vegetation in a rapid and thorough manner.

For ordinary use the apparatus is carried in a wagon past the trees or plants to be powdered.

The following is a full description of our invention, reference being had to the accompanying drawings, in which—

Figure 1:
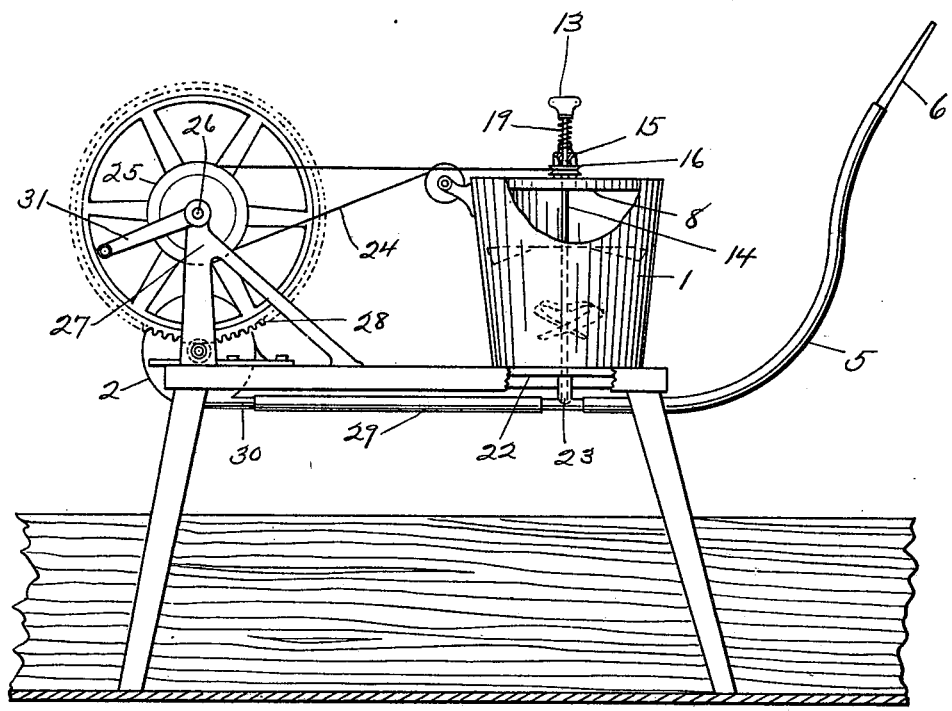
Figure 2:
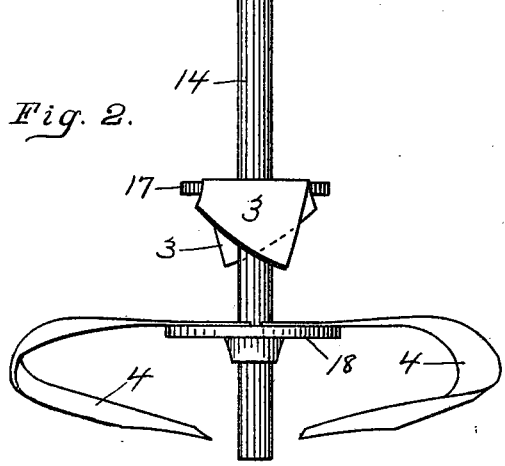
Figure 3:
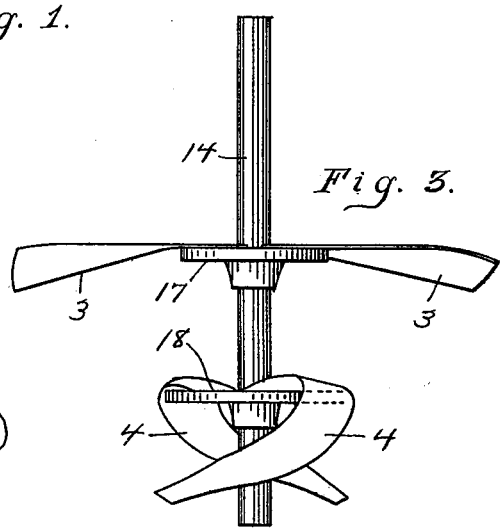

Figure 1 is a side elevation of the apparatus mounted on a wagon-bed in section and broken away, one piece of the apparatus being in section. Fig. 2 is an elevation of the agitators and their shaft. Fig. 3 is an elevation of the same, taken at an angle of ninety degrees therefrom. Fig. 4 is a central vertical section through the powder-receptacle and its connected parts, showing the valve in open position.

Our invention comprises, essentially, a receptacle 1 for the powder, a suitable blower 2, agitator-blades 3 and 4, and a flexible tube 5, terminating in a nozzle 6, which may be extended sectionally to any length desired.

The receptacle 1 is preferably cylindrical and has a bottom 7 and a detachable top 8, provided with an opening 9.

Secured to the bottom 7 of the receptacle in a diametrical position is a bridge-piece 10, having a central perforation through which passes a vertical rod 11. Said rod has secured to its lower end a disk valve 12, as shown in Fig. 4. The upper end of said rod terminates in a hand-knob 13. Revolubly mounted on rod 11 is the tubular agitator-shaft 14, resting upon the bridge-piece 10 and having its upper end journaled in a circular opening in the top of receptacle 1. A bridge-piece 15 (shown in central lateral section in the drawings) is secured to the top of receptacle 1 to support a spiral spring 19 and has a central opening surrounding a portion of the rod 11. Said spring 19 is confined between the knob 13 and bridge-piece 15, around the rod 11. The object of this spring is to control the movement of rod 11, which carries valve 12, having its seat in a T-union 23, hereinafter referred to, by which means the flow of spray can be instantaneously checked or instantaneously started. A pin is secured transversely through rod 11 just below or at the bottom of said knob, so that the spring 19 raises said rod whenever knob 13 is not held down. A circular nut or bushing 20 is threaded upon the upper end of said rod, above the bridge-piece 15. Said nut limits and regulates the downward movement of the rod 11, and consequently the width of the annular opening formed between the valve 12 and its seat, thus regulating the amount of powder delivered through tube 21 into the air-blast to any volume desired. Spring 19 normally holds said valve up against its seat, which is the lower end of a short piece of tubing 21, externally screw-threaded and screwed concentrically with rod 11 into bench 22, with enough of said tube extending above said bench to fit snugly a circular opening in the bottom 7 of receptacle 1. Said receptacle is secured by bolts 7ª to the bench 22, with nuts accessible under the bottom thereof for the secure fastening or convenient removal of said receptacle to or from the machine.

The T-union 23 is threaded upon the lower portion of tube 21 the proper distance to allow the fullest vertical motion to valve 12.

A grooved pulley 16 is secured to the agitator-shaft 14 between bridge-piece 15 and the receptacle-top. Upon said agitator-shaft, at suitable heights from the bottom thereof, are secured two disks 17 and 18. Secured to disk 17 are the inner ends of two oppositely-disposed agitator-blades 3, and secured to disk 18 are the inner upper ends of a pair of recurving agitator-blades 4. The blades 4 are bent downwardly and then inwardly and downwardly. The blades 3 are approximately straight and horizontal. We do not wish to limit ourselves to any precise conformation of said blades, as blades having somewhat different forms might produce the desired effect, which is the agitation of the powder contained in receptacle 1.

The pulley 16 and shaft 14 are driven by a belt 24, which is driven by a pulley 25, secured to a horizontal shaft 26, journaled in a pair of braced standards 27, secured to the top of the bench.

Adjacent to pulley 25 is a gear-wheel 28, secured to shaft 26. Said gear-wheel drives, by a pinion, the blower 2, the lower portion of which depends through an opening in the top of the bench. We may employ a belt and pulleys or other form of driving-gear instead of the toothed wheel 28 and a pinion. A tube 29 connects the outlet 30 of said blower with one branch of the T-union 23. To the opposite branch of the T is attached the powder-tube 5, to one end of which the nozzle 6 is attached.

The operation of the apparatus is as follows: The blower 2 and agitator-blades 3 4 are put in motion by a crank 31, secured on shaft 26. Receptacle 1 is filled with insecticide or fungicide powder through opening 9, which is then closed. Valve 12 is opened by depressing knob 13. The blast of air from the blower carries the powder or dust from its delivery at valve 12 through flexible tube 5 and nozzle 6 as long as valve 12 is kept open by pressure on knob 13, which may also be arranged to open by the foot of the operator by suitable attachments.

The lower agitator-blades 4 when revolving not only agitate and mix the powder, but draw it inwardly toward the tube 21.

We may employ some form of catch for holding the valve-rod 11 depressed at certain times; but this is not essential.

Having thus fully described our invention, what we claim as new, and desire to secure by Letters Patent, is—

1. In a dry-powder-spraying apparatus, a cylindrical powder-receptacle, a diametrical bridge-piece secured to the top thereof, a diametrical bridge-piece secured to the inner side of the bottom thereof, a rotatable tubular shaft resting on said bottom bridge-piece and extending through the opening in the top, an eduction-tube passing through the bottom of said receptacle in alinement with said tubular shaft, a valve-rod of smaller diameter than the bore of said tube, having its lower end within and concentric with said tube, said valve-rod extending through said bridge-pieces and said tubular shaft and having a screw-threaded portion projecting above said shaft, a nut engaging said portion, a knob mounted on the upper end of said rod, a cross-pin fixed in said rod below said knob, a compression-spring confined between said pin and said upper bridge-piece, a disk valve secured to the lower end of said valve-rod, normally seated in or upon the outer end of said eduction-tube, and a chamber inclosing said valve, said chamber having two oppositely-arranged openings therein, substantially as described.

2. In a dry-powder-spraying apparatus, a cylindrical powder-receptacle, a bridge-piece secured to the top thereof, a bridge-piece secured to the inner side of the bottom thereof, a rotatable tubular shaft resting on said bottom bridge-piece and extending through an opening in the top of the receptacle, an upper and a lower disk secured on said shaft within said receptacle, a pair of approximately-horizontal agitator-blades secured to said upper disk, a pair of recurving agitator-blades secured to said lower disk, an eduction-tube passing through the bottom of said receptacle in alinement with said shaft, a valve-rod within said shaft, and having a screw-threaded portion projecting above said shaft, a nut on said threaded portion, a knob on the upper end of said rod, a compression-spring confined between said knob and said upper bridge-piece, a disk valve secured to the lower end of said rod, normally seated in or upon the lower end of said eduction-tube, and a chamber inclosing said valve and having two oppositely-arranged openings therein and means for spraying the powder.

In testimony whereof we affix our signatures in the presence of witnesses.

JACOB J. KISER.
GEORGE C. JOHNSON.

Witnesses as to the signature of Jacob J. Kiser:
  R. W. SMITH,
  T. Y. GRANTHAM.

Witnesses as to the signature of George C. Johnson:
  M. L. LANGE,
  M. N. HIGDON.